United States Patent
Iwamoto

(10) Patent No.: US 7,864,276 B2
(45) Date of Patent: Jan. 4, 2011

(54) LIQUID CRYSTAL DISPLAY DEVICE

(75) Inventor: Yoshihisa Iwamoto, Yokohama (JP)

(73) Assignee: Stanley Electric Co., Ltd., Tokyo (JP)

( * ) Notice: Subject to any disclaimer, the term of this patent is extended or adjusted under 35 U.S.C. 154(b) by 637 days.

(21) Appl. No.: 11/729,260

(22) Filed: Mar. 27, 2007

(65) Prior Publication Data

US 2007/0229739 A1    Oct. 4, 2007

(30) Foreign Application Priority Data

Mar. 29, 2006  (JP)  .............................. 2006-091816

(51) Int. Cl.
*G02F 1/1335* (2006.01)

(52) U.S. Cl. .................. 349/117; 349/129; 349/130; 349/178; 349/179; 349/180; 349/118; 349/119

(58) Field of Classification Search ......... 349/179–181, 349/117–119, 96
See application file for complete search history.

(56) References Cited

U.S. PATENT DOCUMENTS

| | | | |
|---|---|---|---|
| 5,136,407 | A | 8/1992 | Clerc |
| 5,377,028 | A * | 12/1994 | Yoshida et al. ............... 349/76 |
| 5,912,717 | A | 6/1999 | Sugiyama et al. |
| 6,642,981 | B1 * | 11/2003 | Ohmura et al. ............. 349/120 |
| 6,661,488 | B1 | 12/2003 | Takeda et al. |
| 6,724,452 | B1 | 4/2004 | Takeda et al. |
| 7,184,112 | B2 * | 2/2007 | Kuzuhara et al. ............. 349/96 |
| 7,599,040 | B2 * | 10/2009 | Asao .......................... 349/179 |
| 2002/0033929 | A1 * | 3/2002 | Sudo et al. ................... 349/182 |
| 2002/0054260 | A1 * | 5/2002 | Maeda et al. ............... 349/117 |
| 2006/0028601 | A1 * | 2/2006 | Kawahara et al. ........... 349/117 |
| 2006/0109404 | A1 * | 5/2006 | Maeda ....................... 349/119 |

FOREIGN PATENT DOCUMENTS

| | | |
|---|---|---|
| JP | 2507122 | 4/1996 |
| JP | 09-211468 | 8/1997 |
| JP | 2872628 | 1/1999 |
| JP | 11-160706 | 6/1999 |
| JP | 11-160707 | 6/1999 |
| JP | 2947350 | 7/1999 |
| JP | 11-258605 | 9/1999 |

* cited by examiner

*Primary Examiner*—David Nelms
*Assistant Examiner*—Thanh-Nhan P Nguyen
(74) *Attorney, Agent, or Firm*—Holtz, Holtz, Goodman & Chick, PC

(57) ABSTRACT

A liquid crystal display has (i) first and second substrates having electrodes and a pretilt angle of 88.5° to 89.5°, (ii) a liquid crystal layer, having a thickness d and made of liquid crystal molecule material which has a twist structure at a twist angle of 160° to 240° in a voltage application state, the liquid crystal layer containing chiral material having a pitch of p, where d/p is 0.2 to 0.74, (iii) a first polarizer disposed facing the first substrate, the first polarizer having as a transmission axis direction a first direction, (iv) a second polarizer disposed facing the second substrate, the second polarizer having as a transmission axis direction a second direction having an angle of 85° to 95° relative to the first direction, and (v) an optical anisotropic plate disposed at least one of between the first substrate and first polarizer and between the second substrate and second polarizer.

7 Claims, 10 Drawing Sheets

PRIOR ART

PRIOR ART

PRIOR ART

PRIOR ART

PRIOR ART

PRIOR ART

US 7,864,276 B2

LIQUID CRYSTAL DISPLAY DEVICE

CROSS REFERENCE TO RELATED APPLICATION

This application is based on and claims priority of Japanese Patent Application No. 2006-091816 filed on Mar. 29, 2006, the entire contents of which are incorporated herein by reference.

BACKGROUND OF THE INVENTION

A) Field of the Invention

The present invention relates to a liquid crystal display, and more particularly to a vertical alignment type liquid crystal display.

B) Description of the Related Art

A so-called vertical alignment type liquid crystal display (LCD) has two transparent substrates and a liquid crystal layer sandwiched between the substrates, and arranges liquid crystal molecules perpendicular to boundary planes between the liquid crystal layer and substrates or slightly inclined from the plane perpendicular to the boundary planes. Retardation of this liquid layer is 0 or almost 0 when viewed from the front side in the state that voltage is not applied. Therefore, if two polarizers are disposed in a cross nicol arrangement on the outer sides of the liquid crystal cell, a normally black type display having good black display quality can be manufactures because of the quenching performance of the two polarizers cross-nicol disposed.

As an example of a vertical alignment type LCD having good viewing angle characteristics, a multi-domain vertical alignment type LCD is known which controls liquid crystal molecule alignment to have a plurality of alignment directions in one pixel.

Multi-domain is realized by generating an oblique electric field between upper and lower substrates by forming slits in electrodes disposed on the inner surface of the substrate (e.g., refer to Japanese Patent Gazette No. 2507122) or by forming projections on the substrate plane (e.g., refer to Japanese Patent Gazette No. 2947350).

These methods of realizing multi-domain have disadvantages of a lowered aperture ratio and a lowered optical transmittance of LCD because a slit or projection is disposed in a pixel, although it is unnecessary to positively conduct an alignment process such as a rubbing process for substrate surfaces.

As an example of a vertical alignment type LCD avoiding a lowered aperture ratio and suppressing a reduction in an optical transmittance, a mono-domain pretilt vertical alignment type LCD is known which is provided with a uniform pretilt angle by positively conducting a uniform alignment process because LCD has an electrode structure similar to a conventional TN-LCD and its substrate surface is not irregular.

FIG. 7 is a schematic broken perspective view of a mono-domain pretilt vertical alignment type LCD.

The mono-domain pretilt vertical alignment type LCD is constituted of a pair of substrates (upper substrate 31 and lower substrate 32) and a liquid crystal layer 39 sandwiched between the substrates. The upper substrate 31 and lower substrate 32 are constituted of upper and lower transparent substrates 33 and 34 of, e.g., transparent parallel glass substrates, upper and lower transparent electrodes 35 and 36 formed on opposing planes of the upper and lower transparent substrates 33 and 34, made of transparent conductive material such as indium tin oxide (ITO) and having predetermined patterns, and upper and lower vertical alignment films 37 and 38 formed covering the upper and lower transparent electrodes 35 and 36.

The paired substrates (upper substrate 31 and lower substrate 32) are disposed generally in parallel making the vertical alignment films 37 and 38 face each other, and the liquid crystal layer 39 is sandwiched between the vertical alignment films 37 and 38. A voltage application means 43 is connected across the transparent electrodes 35 and 36 and can apply a desired voltage to the liquid crystal layer 39 between the transparent electrodes 35 and 36. FIG. 7 shows the state of the liquid crystal layer 39 when voltage is not applied across the transparent electrodes 35 and 36.

The upper alignment film 37, lower alignment film 38, or both the upper and lower alignment films 37 and 38 are subjected to a uniform alignment process (providing a uniform pretilt angle) to form a non-defective mono-domain LCD.

An alignment method includes (i) a method of forming a substrate having an anisotropic surface by oblique vapor deposition of $SiO_2$ inorganic metal oxide or by in-line sputtering (e.g., refer to JP-A-HEI-11-160707), a method of forming thereafter a surface active agent film on the anisotropic substrate surface to use it as a polarizer film (e.g., refer to JP-A-HEI-11-160706), (ii) an optical alignment method of irradiating ultraviolet rays to a photosensitive vertical polarizer along an oblique direction relative to the film surface (e.g., refer to Japanese Patent Gazette No. 2872628), (iii) a method of rubbing a vertical polarizer film having a proper surface free energy under proper conditions, and other methods.

Upper and lower polarizers 41 and 42 are disposed in a cross nicol arrangement on outer sides of the paired substrates (upper substrate 31 and lower substrate 32) generally in parallel. Directions of transmission axes of the polarizers 41 and 42 are indicated by arrows. Each of the polarizers 41 and 42 transmits only light polarized along the transmission axis direction.

In the state that no voltage is applied, light incident upward along the display normal is polarized by the lower polarizer 42 along a direction parallel to the arrow direction, transmits through the liquid crystal layer 39 and is intercepted by the upper polarizer 41. Therefore, the vertical alignment type LCD displays "black".

In the state that voltage is applied, the alignment state of liquid molecules 39a changes from that when no voltage is applied. Light incident from the lower polarizer 42 side has optical components along the transmission axis direction of the upper polarizer 41 and transmits through the upper polarizer 41. Therefore, LCD displays "white".

As shown in FIG. 7, X- and Y-directions (arrow direction is a positive direction) are defined which are perpendicular in the in-plane direction of the upper substrate 31 and lower substrate 32. A Z-direction is also defined which extends along a direction perpendicular to the upper substrate 31 and lower substrate 32 and has a positive direction from the lower substrate 32 toward the upper substrate 31, to thereby incorporate the right-handed coordinate system. Angle coordinates in the substrate in-plane counter-clockwise direction (rotation direction toward the negative X-direction) are defined having the positive Y-direction as a 0° azimuth. With these angel coordinates, the negative X-direction is a 90° azimuth, the negative Y-direction is a 180° azimuth, and the positive X-direction is a 270° azimuth.

The azimuth (azimuth indicated by the arrow) of the transmission axis of the upper polarizer 41 is a 45°-225° azimuth, and the azimuth of the transmission axis of the lower polarizer 42 is a 135°-315° azimuth.

The vertical alignment type LCD is associated with a problem of a lowered contrast due to optical through when viewing at a deep polar angle relative to the substrate normal. Deterioration of viewing angle characteristics caused by optical through is considerable particularly in the state that no voltage is applied. It can be considered that there are two factors of forming optical through: exhibition of birefringence effects caused by an increase in a retardation of the liquid crystal; and viewing angle dependency of the polarizer.

Optical through by the viewing angle dependency of the polarizer occurs in the following manner. In the state that the polarizers are disposed in a cross nicol arrangement outside the upper and lower substrates, the apparent layout of the upper and lower polarizers shifts from the cross nicol state as the observation polar angle is made deeper along the direction other than the transmission axis or absorption axis of the polarizers. In an extreme case, a perfect parallel nicol state appears when viewing along the substrate in-plane direction (observation polar angle=90°). Namely, as the observation polar angle is made deep from the normal direction, the polarizer cross nicol state is diminished so that optical through occurs.

Optical through by an increase in a retardation can be improved by using a viewing angle compensation plate which, for example, if the liquid crystal layer has positive uniaxial optical anisotropy, is made of transparent medium having a negative optical anisotropy canceling out the positive optical anisotropy.

FIG. 8 is a schematic broken perspective view of a monodomain pretilt vertical alignment type LCD having a viewing angle compensation plate.

This LCD differs from LCD shown in FIG. 7 in that a viewing angle compensation plate 45 is disposed between an upper transparent substrate 33 and an upper polarizer 41. The viewing angle compensation plate 45 may be inserted between one substrate and the polarizer as shown in FIG. 8, or may be inserted between both the polarizes and substrates.

FIG. 9 shows an observation polar angle dependency of an optical transmittance when a viewing angle compensation plate is used (vertical alignment type LCD shown in FIG. 8) and when a viewing angle compensation plate is not used (vertical alignment type LCD shown in FIG. 7).

The observation polar angle dependency was shown at the 0°-180° azimuth (right-left azimuth) in the no voltage application state under the condition of $R_{th} \approx \Delta nd - 140$ nm, where $R_{th}$ is retardation of the viewing angle compensation plate and $\Delta nd$ ($\Delta n$: liquid crystal material birefringence, d: thickness of liquid crystal layer 39) is a retardation of the liquid crystal layer 39.

The abscissa represents an observation angle (poplar angle) in the unit of "° (degree)". This graph shows an inclination angle (observation angle, polar angle) from the positive Z-direction toward the positive Y-direction (0° azimuth) or toward the negative Y-direction (180° azimuth). An inclination angle from the positive Z-direction toward the positive Y-direction (0° azimuth) was indicated by a positive value, and an inclination angle from the positive Z-direction toward the negative Y-direction (180° azimuth) was indicated by a negative value. An absolute value of the negative observation angle is equal to an inclination angle from the positive Z-direction toward the negative Y-direction (180° azimuth).

The ordinate represents an optical transmittance at each observation angle in the unit of "%".

A curve a shows the relation between an observation angle and an optical transmittance of a vertical alignment type LCD (vertical alignment type LCD shown in FIG. 7) not using a viewing angle compensation plate, and a curve b shows the relation between an observation angle and an optical transmittance of a vertical alignment type LCD (vertical alignment type LCD shown in FIG. 8) using a viewing angle compensation plate.

An optical transmittance (curve a) of LCD not using the viewing angle compensation plate is near 0 up to a polar angle of about 20°, gradually increases from the polar angle of about 20°, is 3% or larger at a polar angle of 60°.

An optical transmittance (curve b) of LCD using the viewing angle compensation plate is smaller than that (curve a) of LCD not using the viewing angle compensation plate, particularly at a polar angle of about 20° or larger, and is a half or smaller at a polar angle of 60°. As seen from this graph, by using the viewing angle compensation plate, optical through can be suppressed and good display quality can be realized particularly at a deep observation angle.

However, as seen from the curve b, optical through cannot be perfectly resolved even by the vertical alignment type LCD using the viewing angle compensation plate. This is because there remains optical through due to the viewing angle dependency of the polarizer.

There is a proposal of LCD capable of preventing optical through to be caused by both the retardation of a liquid crystal layer and the viewing angle dependency of a polarizer (e.g., refer to JP-A-HEI-11-258605).

FIGS. 10A to 10E are schematic broken perspective views of LCDs.

Reference is made to FIG. 10A. LCD shown in FIG. 10A differs from LCD shown in FIG. 7 in that a C plate 46 is additionally disposed between an upper substrate 31 and an upper polarizer 41 and an A plate 47 is additionally disposed between a lower substrate 32 and a lower polarizer 42.

Mutually perpendicular X-axis and Y-axis are defined in the in-plane direction of an optical film (phase difference plate) and a Z-axis is defined in a thickness direction. Refractive indices in the X-, Y- and Z-axes are represented by nx, ny and nz, respectively. The A plate has a refractive index distribution of nx>ny=nz, whereas the C plate has a refractive index distribution of nx≈ny>nz.

The A plate 47 is an optical film (phase difference plate) having a positive uniaxial optical anisotropy and an optical axis in the in-plane, and the C plate 46 is an optical film (phase difference plate) having a negative, almost uniaxial optical anisotropy and an optical axis in the thickness direction.

By using the A plate 47 and C plate 46, it becomes possible to prevent optical through to be caused both by the retardation of the liquid crystal layer and by the polarizer. This is because the C plate 46 (negative uniaxial optical anisotropy) has a function of canceling (compensating) the retardation (positive uniaxial optical anisotropy) of the liquid crystal layer during oblique observation, and the A plate 47 when used with the C plate 46 can realize an optical function of resolving the viewing angle dependency of the polarizer. An in-plane retardation $R_e$ of an optical film (phase difference plate) is defined by $R_e=(nx-ny)\times d$ where d is a thickness of the optical film, and a thickness direction retardation $R_{th}$ is defined by $R_{th}=[\{(nx+ny)/2\}-nz]\times d$.

As shown in FIG. 10C, the A plate and C plate stacked together may be disposed on the upper surface of the upper substrate or on the lower surface of the lower substrate. In this case, advantages similar to those of FIG. 10A can be obtained even if the C plate is disposed on the plane near the cell and the A plate is disposed on the plane near the polarizer.

Reference is made to FIG. 10B. LCD shown in FIG. 10B differs from LCD shown in FIG. 7 in that a biaxial film 48 is additionally disposed between an upper substrate 31 and an upper polarizer 41.

The biaxial film 48 is an optical film having a negative biaxial optical anisotropy and collecting the functions of the A plate and C plate in one optical film. Namely, a negative biaxial film is an optical film defined by nx>ny>nz.

By using the biaxial film 48, advantages similar to those obtained when the A plate 47 and C plate 46 are used can be obtained.

FIG. 10B shows the structure of FIG. 10C reducing the number of optical films, and this structure can provide the optical characteristics generally equivalent to those of FIG. 10C).

As shown in FIGS. 10D and 10E, even if the A plate used in FIGS. 10A and 10C is replaced with the biaxial film, almost similar advantages can be obtained.

When the mono-domain pretilt vertical alignment type LCD shown in FIG. 7 is observed at deep observation polar angles, it is recognized that there appears the phenomenon that luminances (optical transmittances) are different between the 0° azimuth and the 180° azimuth, in the state that no voltage is applied or in the state that a voltage near a threshold voltage (corresponding to no selection of voltage in simple matrix drive) is applied to LCD for low luminance emission. For example, in a simple matrix drive display of a segment display type, different luminances (optical transmittances) appear depending on an observation azimuth, when a display area is in a non-selection state (off segment). In the state that no voltage is applied, it can be seen from FIG. 9 that optical transmittances at a polar angle of, e.g., 60° at the 0° azimuth and the 180° azimuth are definitely different.

The present inventor simulated the optical transmittance of a mono-domain pretilt vertical alignment type LCD under the no voltage application condition and the voltage near threshold voltage application condition, by using a pretilt angle as a parameter. A simulation target LCD had the structure that a C plate as the viewing angle compensation plate is inserted between the lower substrate and lower polarizer of the mono-domain pretilt vertical alignment LCD shown in FIG. 7. The observation azimuth used was the 0° azimuth and 180° azimuth described with reference to FIG. 7, and the observation polar angle was set to 50° (an angle inclined from the substrate normal direction toward the substrate in-plane by 50°).

Simulation was conducted by using an LCD simulator LCD master 6 manufactured by Thing Tech Co. Ltd. When other simulations described in this specification were conducted, this simulator was used.

The alignment process direction (rubbing direction) of the lower substrate of the simulation target LCD was set to the 270° azimuth, and that of the upper substrate was set to the 90° azimuth, to realize antiparallel alignment between the upper and lower substrates. The liquid crystal layer is made of liquid crystal material having a negative dielectric constant anisotropy ($\Delta\epsilon<0$), specifically $\Delta\epsilon=-5.1$ to set a retardation $\Delta$nd to about 0.36 μm. Chiral material was not added. SHC125U manufactured by Polatechno Co., Ltd was used for the upper and lower polarizers. The azimuths of transmission axes of the upper and lower polarizers were set to a 45°-225° azimuth and a 135°-315° azimuth, respectively. The C plate was made of norbornene resin and has a thickness retardation $R_{th}$ of 220 nm.

FIG. 1 is a graph showing simulation results.

The abscissa of the graph represents a pretilt angle in the unit of "° (degree)" and the ordinate represents an optical transmittance in the unit of "%".

A curve c1 shows the relation between a pretilt angle and an optical transmission when observing from the 0° azimuth in a no voltage application state. A curve c2 shows the relation when observing from the 180° azimuth in a no voltage application state. Curves d1 and d2 show the relations thereof when observing from the 0° azimuth and 180° azimuth, respectively, in a voltage near threshold voltage application state.

Reference is made to the curves c1 and c2. At a pretilt angle of 90°, there is no difference between optical transmittances when observing from the 0° azimuth and from the 180° azimuth. However, as the pretilt angle is made smaller, the optical transmittance linearly increases at the 0° azimuth, whereas the optical transmittance linearly decreases at the 180° azimuth. Therefore, the smaller the pretilt angle is, the larger a difference of optical transmittances between the 0° azimuth and 180° azimuth is.

Reference is made to the curves d1 and d2. Also in the voltage near threshold voltage application state, at a pretilt angle of 90°, optical transmittances are the same when observing from the 0° azimuth and from the 180° azimuth. This optical transmittance is equal to that when observing from the 0° azimuth and from the 180° azimuth in the no voltage application state.

However, as the pretilt angle is made smaller, the optical transmittance linearly increases at the 0° azimuth, whereas the optical transmittance linearly decreases at the 180° azimuth. An increase rate and a decrease rate are larger than those in the no voltage application state. Therefore, the more the polar angle azimuth is inclined, the larger a difference of optical transmittances becomes between the 0° azimuth and 180° azimuth, and the difference is large than that in the no voltage application state.

The simulation results coincide with the external observation of LCD.

In the graph shown in FIG. 1, the reason why the optical transmittance when observing at the 0° azimuth is larger than that when observing at the 180° azimuth is the uniaxial pretilt alignment and that the viewing angle compensation plates are asymmetrically disposed on the upper and lower sides of the liquid crystal cell. If the viewing angle compensation plates having quite the same characteristics are disposed on the upper and lower sides of the liquid crystal cell, it is possible to obtain the same optical transmittance both at the 0° and 180° azimuths, independently from the pretilt angle in the liquid crystal layer. However, the number of optical films used increases, resulting in disadvantages of cost. The transmittance at the 180° azimuth can be reversed to that at the 0° azimuth by changing the transmission axis azimuths of the upper and lower polarizers or moving the C plate from the lower side of the cell to the upper side of the cell.

Then, the inventor studied the relation between an in-plane direction retardation of a biaxial film and a minimum optical transmittance in the no voltage application state, by using LCD having the biaxial film as a substitute for the C plate of the above-described simulation target, i.e., by using a new simulation target having as a viewing angle compensation plate a biaxial film inserted between a lower substrate and a lower polarizer in the mono-domain pretilt vertical alignment type LCD shown in FIG. 7.

LCD used as the new simulation target is different from the above-described simulation target in that the C plate is replaced with a biaxial film and a retardation of the liquid crystal layer is set to $\Delta$nd of about 0.38 μm. A thickness direction retardation $R_{th}$ of the biaxial film was set to 250 nm and an in-plane delay phase axis was set to a 135°-315° azimuth.

Similar to the above-described simulation, an observation azimuth was set to the 0° azimuth and 180° azimuth and an observation polar angle was set to 50°.

FIG. 2 is a graph showing the simulation results.

The abscissa of the graph represents an in-plane retardation Re of the biaxial film in the unit of "nm" and the ordinate represents an optical transmittance in the unit of "%".

A curve e1 indicates the relation between the in-plane retardation Re and the minimum optical transmittance when observing along the 0° azimuth at a pretilt angle of 90°. A curve e2 indicates the relation when observing along the 180° azimuth at a pretilt angle of 90°. The curves e1 and e2 are the same and drawn superposed one upon the other.

A curve f1 and a curve f2 indicate the relations when observing along the 0° azimuth and 180° azimuth at a pretilt angle of 89°.

A curve g1 and a curve g2 indicate the relations when observing along the 0° azimuth and 180° azimuth at a pretilt angle of 88°.

A curve h1 and a curve h2 indicate the relations when observing along the 0° azimuth and 180° azimuth at a pretilt angle of 85°.

Referring to each pair of the curve e1 and curve e2, curve f1 and curve f2, curve g1 and curve g2, curve h1 and curve h2, description will be made on comparison between these pairs. The Re dependencies of the optical transmittance are quite the same when observing along the 0° azimuth and 180° azimuth at the pretilt angle of 90°. However, the Re dependency of the optical transmittance when observing along the 0° azimuth at a pretilt angle other than 90° is different from that when observing along the 180° azimuth. There is a tendency that a difference between optical transmittances along both the azimuths at the same Re becomes larger as the pretilt angle becomes smaller.

One curve of each of the four pairs of the curves crosses the other curve at Re of near 50 nm. At this cross point, LCD can be observed at the equal optical transmittance along both the 0° and 180° azimuths.

As seen from the cross points between the curve e1 and curve e2, between the curve f1 and curve f2, between the curve g1 and curve g2, and between the curve h1 and curve h2, as the pretilt angle becomes smaller, the optical transmittance at the cross point (point where the optical transmittances are equal when viewing from the right and left sides) becomes larger. According to the study results by the present inventor, this tendency exhibits also for LCD using a combination of the A and C plates in place of the biaxial film. These simulation results are coincident with external observation of LCD.

Transmittances were simulated for LCD having a C plate as the viewing angle compensation plate between the lower substrate and lower polarizer of the mono-domain pretilt vertical alignment type LCD shown in FIG. 7, along the 0° and 180° azimuths, at a polar angle of 50° while the retardation Δnd of the liquid crystal layer is changed. A thickness direction retardation $R_{th}$ of the C plate was adjusted to $R_{th}$=Δnd−140 nm. The pretilt angles on the upper and lower substrates were fixed to 89°.

The simulation results are shown in FIG. 11. It can be seen that as the retardation Δnd becomes larger, a transmittance at the 0° azimuth increases and a transmittance at the 180° azimuth decreases, and a difference therebetween becomes larger.

It can be seen that at Δnd of 0.58 μm or larger, a transmittance difference between the 0° and 180° azimuths is a two-fold or more. Namely, it can be seen that as the retardation Δnd becomes larger, a transmittance difference between the 0° and 180° is definite also from external observation. It is remarkable particularly at $\Delta nd \geqq 0.58$ μm. This phenomenon does not appear at all at the pretilt angle of 90°. Conversely, as the pretilt angle becomes smaller, this phenomenon can be observed as more remarkable effects. This phenomenon occurs also when the biaxial film or a combination of the A and C plates is used as the viewing angle compensation plate.

The present inventor has pointed out in JP-A-2004-267160 that a uniform mono-domain alignment cannot be obtained at a pretilt angle of 90° to 89.5° of liquid crystal molecules positioned at the center of the liquid crystal layer in a thickness direction in a mono-domain pretilt vertical alignment type LCD whose substrate surfaces were subject to an alignment process such as shown in FIG. 7, and that it is therefore preferable to set the pretilt angle to 89.5° or smaller in the central area of the liquid crystal layer of a mono-domain pretilt vertical alignment type LCD whose one or both substrates were subject to the alignment process. If the pretilt angle is set to about 90°, there is a possibility that the alignment process method and an alignment film material are limited so that it is not preferable from the viewpoint of narrowing a margin of LCD manufacture.

When considering the indication in JP-A-2004-267160 and the above-described simulation results, it may be considered that it is difficult to manufacture LCD having a high contrast and an optical transmittance symmetry both on the right and left sides.

SUMMARY OF THE INVENTION

An object of this invention is to provide a liquid crystal display having a good display quality.

According to one aspect of the present invention, there is provided a liquid crystal display comprising: a first substrate provided with an electrode pattern and subjected to an alignment process of giving a pretilt angle of 88.5° or larger and 89.5° or smaller; a second substrate disposed generally in parallel to the first substrate, provided with an electrode pattern and subjected to an alignment process of giving a pretilt angle of 88.5° or larger and 89.5° or smaller; a liquid crystal layer squeezed between the first substrate and the second substrate, having a thickness of d and made of liquid crystal molecule material which is aligned generally perpendicular to the first substrate and the second substrate in a no voltage application state in accordance with the alignment processes subjected to the first substrate and the second substrate and has a twist structure at a twist angle of 160° or larger and 240° or smaller in a voltage application state, the liquid crystal layer containing chiral material having a chiral pitch of p, where d/p is 0.2 or lager and 0.74 or smaller; a first polarizer disposed facing a plane of the first substrate on a side opposite to the liquid crystal layer, the first polarizer having as a transmission axis direction a first direction; a second polarizer disposed facing a plane of the second substrate on a side opposite to the liquid crystal layer, the second polarizer having as a transmission axis direction a second direction having an angle of 85° or larger and 95° or smaller relative to the first direction as viewed along a normal direction of the first substrate and the second substrate; and an optical anisotropic plate having an in-plane direction generally in parallel to the first and second polarizers and disposed at least one of between the first substrate and the first polarizer and between the second substrate and the second polarizer.

According to the present invention, it is possible to provide a liquid crystal display having a good display quality.

DESCRIPTION OF THE PREFERRED EMBODIMENTS

The present inventor has researched vigorously toward realizing LCD having symmetrical viewing angle characteristics even in a no voltage application state or in a voltage near threshold voltage application state.

The present inventor simulated first the relation between a twist angle of liquid crystal molecules and an optical transmittance.

Figure 3:
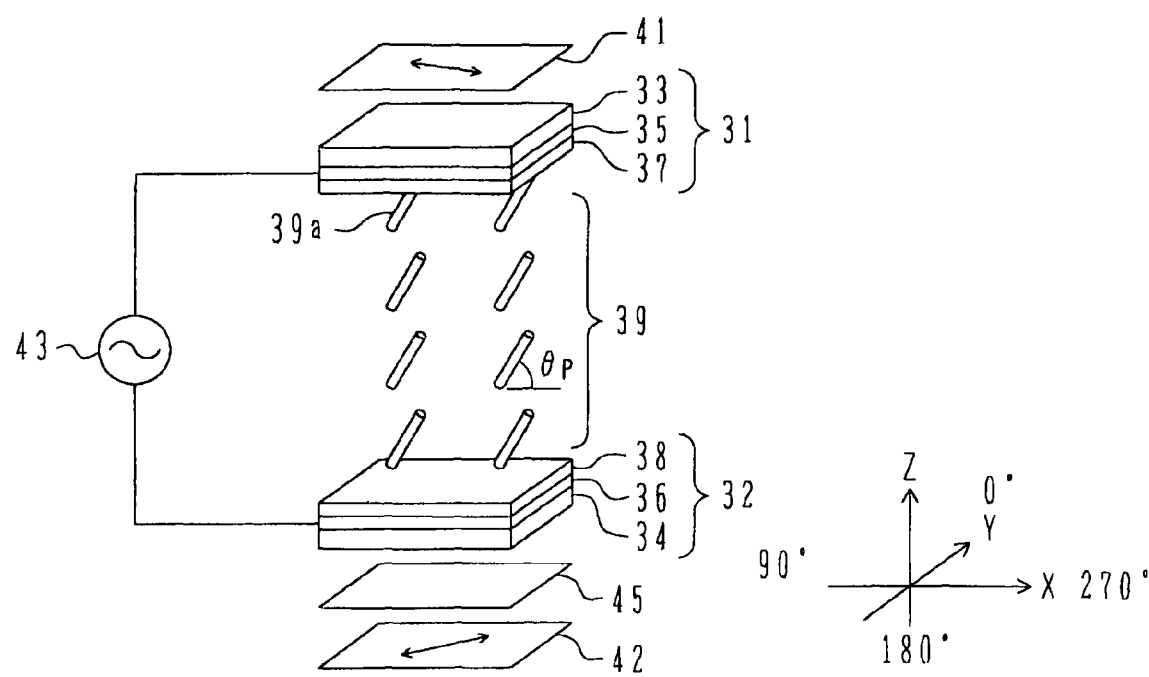
FIG. 3 is a schematic broken perspective view showing an example of the internal structure of LCD used for a simulation target.
Figure 7:
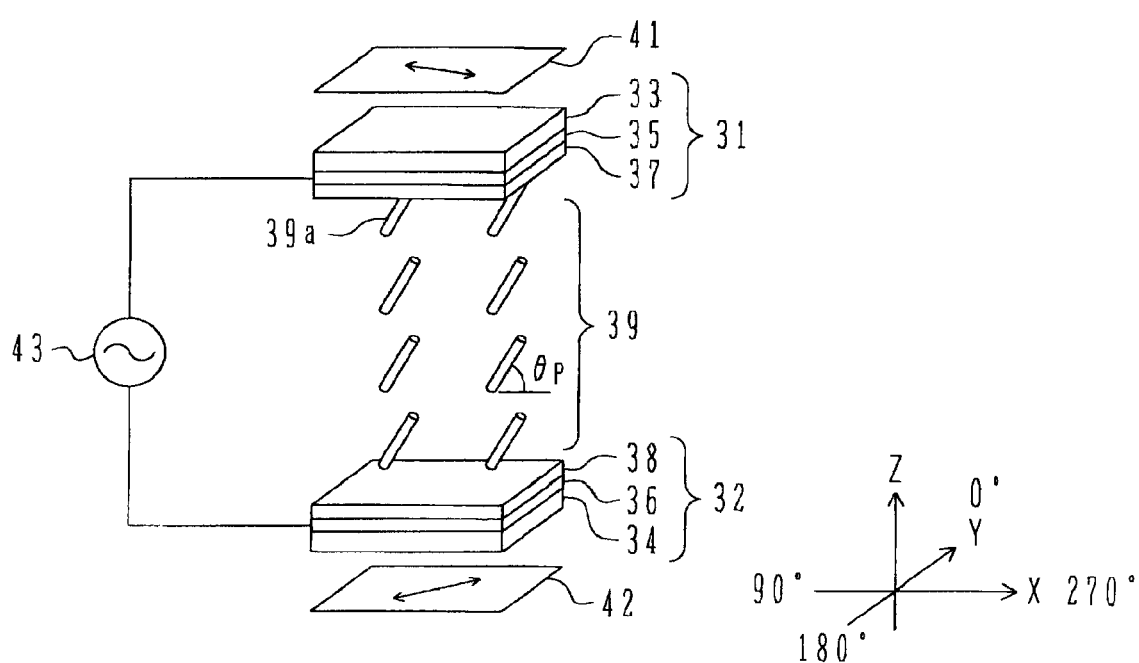
FIG. 7 is a schematic broken perspective view of a mono-domain pretilt vertical alignment type LCD.
Figure 8:
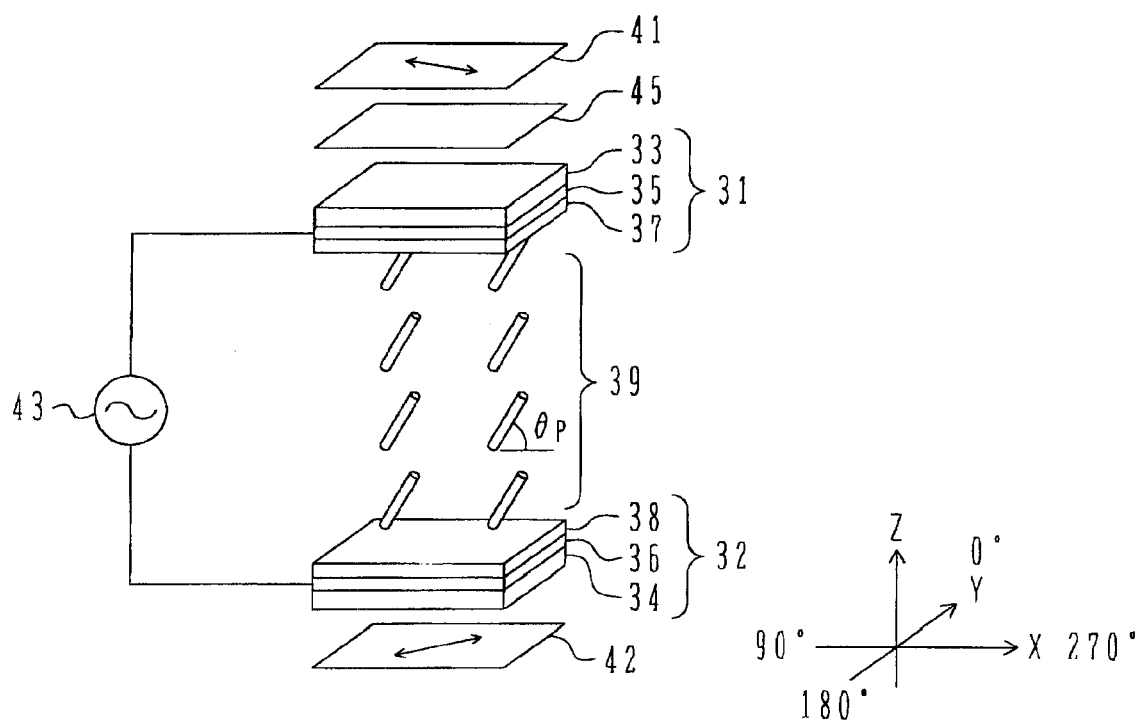
FIG. 8 is a schematic broken perspective view of a mono-domain pretilt vertical alignment type LCD having a viewing angle compensation plate.
Figure 9:
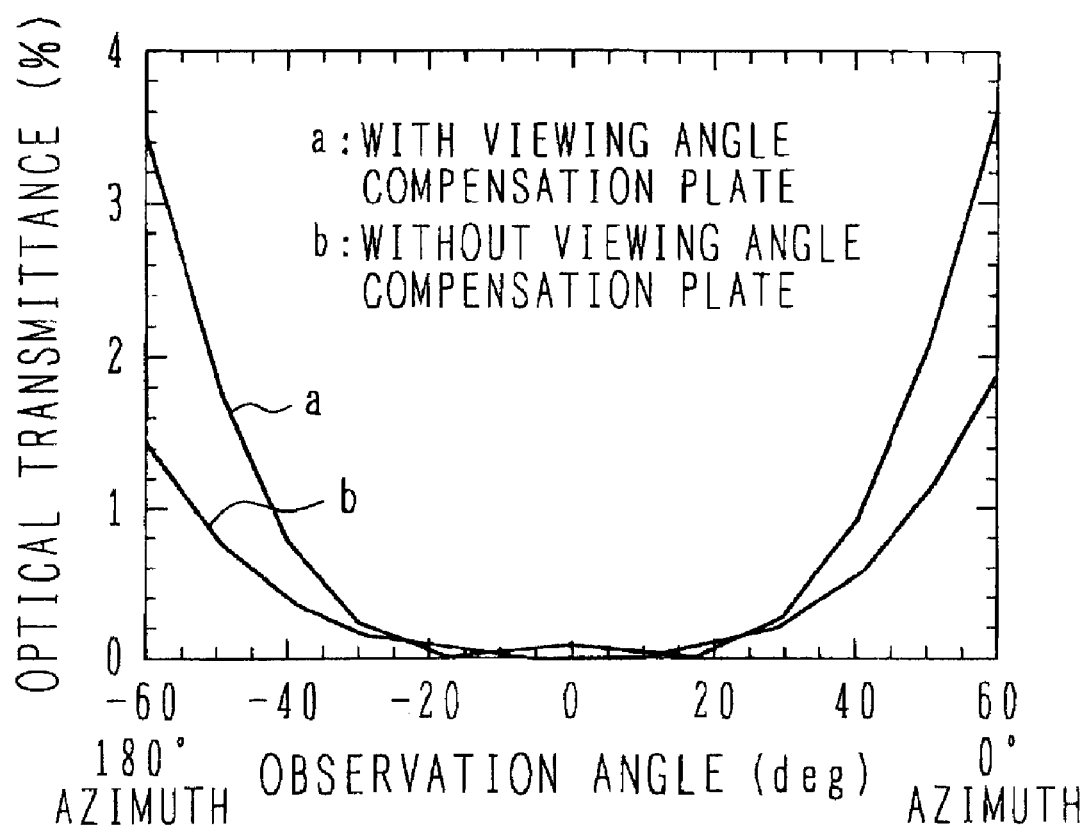
FIG. 9 is a graph showing an observation polar angle dependency of an optical transmittance when a viewing angle compensation plate is used (the vertical alignment type LCD shown in FIG. 8) and when the viewing angle compensation plate is not used (the vertical alignment type LCD shown in FIG. 7).
Figure 10A:
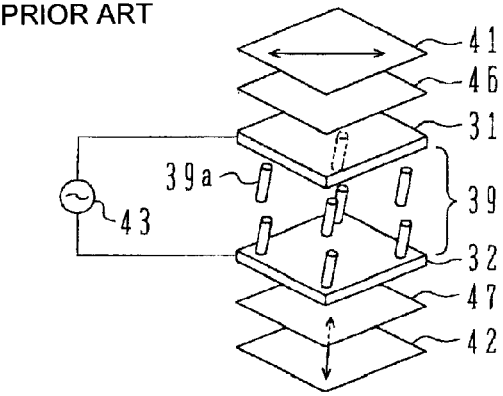
FIGS. 10A to 10E are schematic broken perspective views of LCD.
Figure 10B:
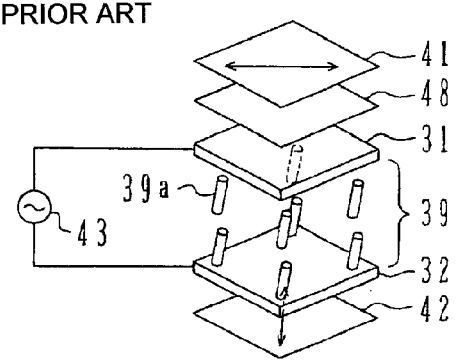
Figure 10C:
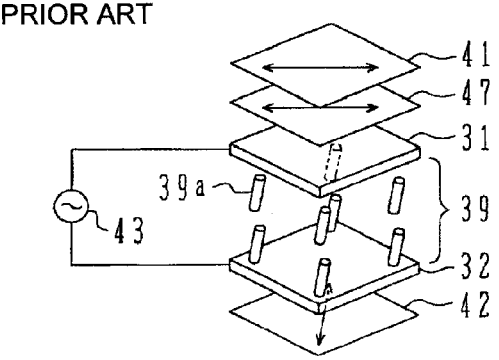
Figure 10D:
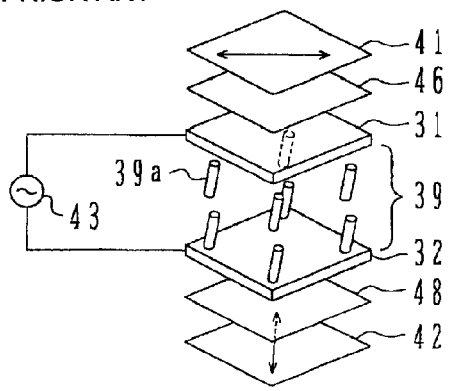
Figure 10E:
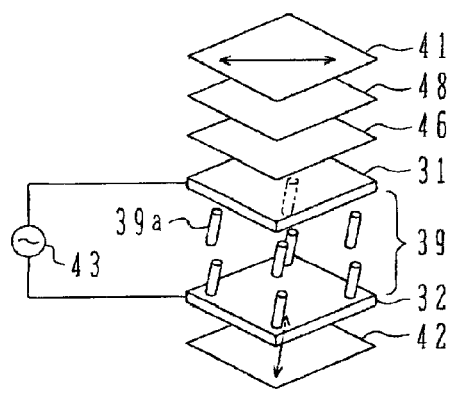
Figure 11:
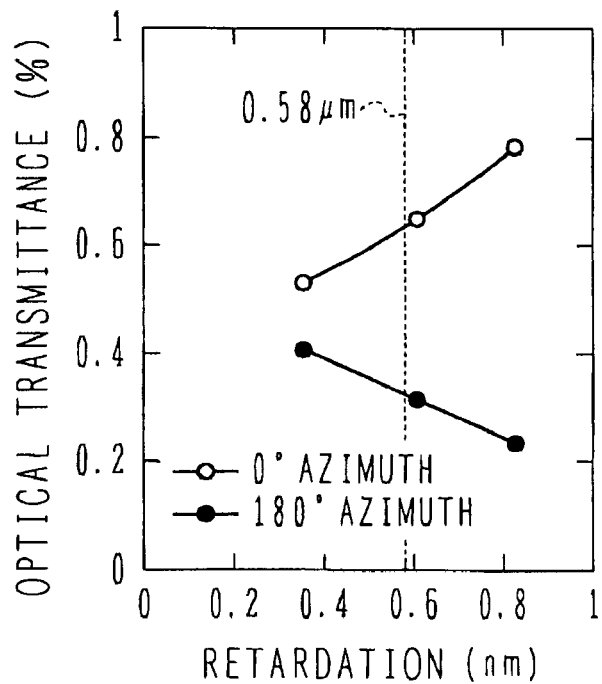
FIG. 11 is a graph showing the relation between a retardation and an optical transmittance.

FIG. 3 is a schematic broken perspective view showing an example of the internal structure of LCD used as a simulation target. The simulation target is LCD having the structure that a C plate is inserted as the viewing angle compensation plate 45 between the lower substrate and lower polarizer of the mono-domain pretilt vertical alignment type LCD shown in FIG. 7. This LCD is the same as that used for the simulation target for obtaining the results shown in FIG. 1.

Figure 1:
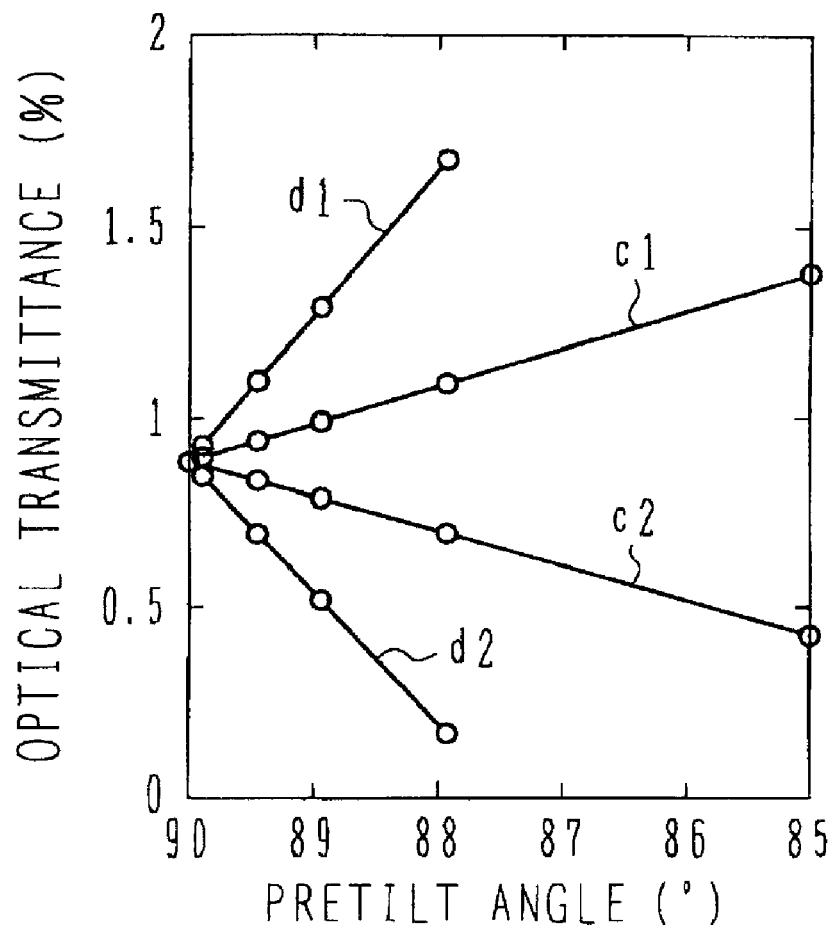
FIG. 1 is a graph showing simulation results.

Upper and lower polarizers, a transmission axis layout of the polarizers, material of the C plate, its thickness direction retardation $R_{th}$, a retardation $\Delta nd$ of a liquid crystal layer, a value of a dielectric constant anisotropy $\Delta\epsilon$ are all set to the same as those of LCD used for the simulation target for obtaining the results shown in FIG. 1.

A twist angle of liquid crystal molecules was changed by changing the alignment direction (rubbing direction) of the upper and lower substrates. The alignment directions of the upper and lower substrates were determined in such a manner that the alignment direction of liquid crystal molecules positioned at the center of the liquid crystal in the thickness direction takes the 270° azimuth. Therefore, for example, a twist angle of 180° can be realized by setting both the alignment azimuths of the upper and lower substrate to 0° (parallel alignment). A twist direction was set to a left twist.

In order to realize a twist angle of 45° or larger, left swift chiral material is added to liquid crystal material to set a ratio d/p of a liquid crystal layer thickness d to a chiral pitch p, to 0.25. The pretilt angle was set to 89° on both the upper and lower substrates.

The present inventor simulated a twist angle dependency of an optical transmittance of the simulation target in a no voltage application state and in a voltage near threshold voltage application state. The observation azimuth was set to the 0° and 180° azimuths and an observation polar angle was set to 50°.

Figure 4:
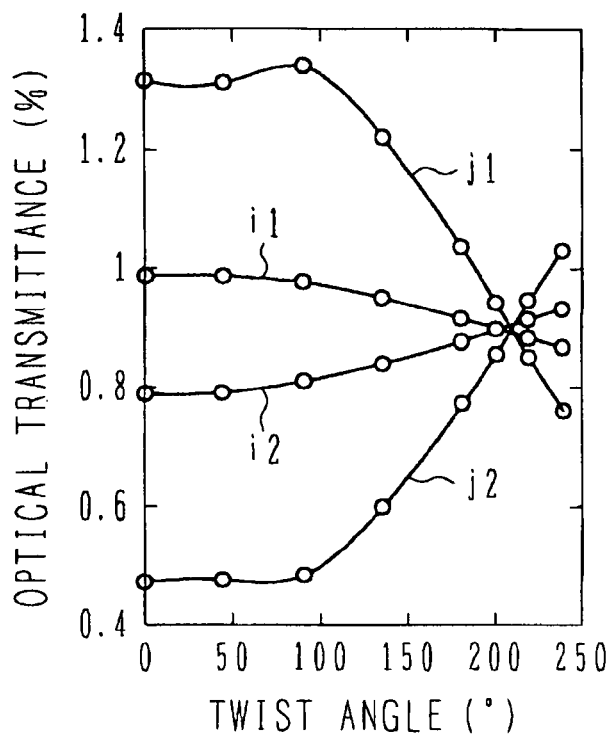
FIG. 4 is a graph showing simulation results.

FIG. 4 is a graph showing the simulation results.

The abscissa of the graph represents a twist angle in the unit of "° (degree)" and the ordinate represents an optical transmittance in the unit of "%".

A curve i1 indicates the relation between a twist angle and an optical transmittance when observing along the 0° azimuth in the no voltage application state. A curve i2 indicates the relation when observing along the 180° azimuth in the voltage near threshold voltage application state. Curves j1 and j2 indicate the relation when observing along the 0° and 180° azimuths in the voltage near threshold voltage application state, respectively.

Reference is made to the curves i1 and i2. There is no large difference between optical transmittances on the right and left sides (180°-0°) azimuth, independently from the twist angle, and the twist angle dependency of the optical transmittance is not remarkable. As the twist angle becomes larger from 0°, a difference between optical transmittances on the right and left sides becomes smaller, and the difference is 0 at a twist angle of about 210°. At a twist angle exceeding 210°, the magnitudes of the optical transmittances are reversed at the 0° and 180° azimuths, and as the twist angle becomes larger, a difference between optical transmittances increases again.

Reference is made to the curves j1 and j2. In the voltage near threshold voltage application state, there is a large difference between optical transmittances on the right and left sides (180°-0° azimuth), and the twist angle dependency of the optical transmittance is remarkable.

At a twist angle of about 0° to 90°, the optical transmittances are generally constant along both the right and left azimuths so that a difference between optical transmittances at the right and left azimuths is also generally constant.

In the range of a twist angle exceeding 90°, as the twist angle becomes larger, a difference becomes small between the optical transmittance when observing at the 0° azimuth and the optical transmittance when observing at the 180° azimuth.

At a twist angle of 160° or larger, a difference between optical transmittances on the right and left sides is about a half or smaller than a difference between optical transmittances on the right and left sides without the twist structure (at a twist angle of 0°).

At a twist angle of 180° or larger, a difference between optical transmittances on the right and left sides is about one thirds or smaller than a difference between optical transmittances on the right and left sides without the twist structure (at a twist angle of 0°).

At a twist angle of about 210°, a difference between optical transmittances on the right and left sides is 0.

At a twist angle exceeding 210°, the amplitudes of the optical transmittances are reversed between the 0° azimuth and 180° azimuth, and as the twist angle increases, a difference between optical transmittances increases again.

At a twist angle of about 240°, a difference between optical transmittances on the right and left sides takes again about one thirds of a difference between optical transmittances on the right and left sides without the twist structure (a twist angle of 0°).

As shown in FIG. 10, at a twist angle of 0°, as the retardation Δnd of the liquid crystal layer becomes large, an optical transmittance difference becomes large between the 0° and 180° azimuths (right and left azimuths). The present inventor simulated how the twist angle dependency of the optical transmittances at the 0° and 180° azimuths shown in FIG. 4 changes if the magnitude of Δnd increases. In the simulation, Δnd was set to 825 nm and the thickness direction retardation $R_{th}$ of the C plates was determined from Δnd−140 nm.

Figure 12:
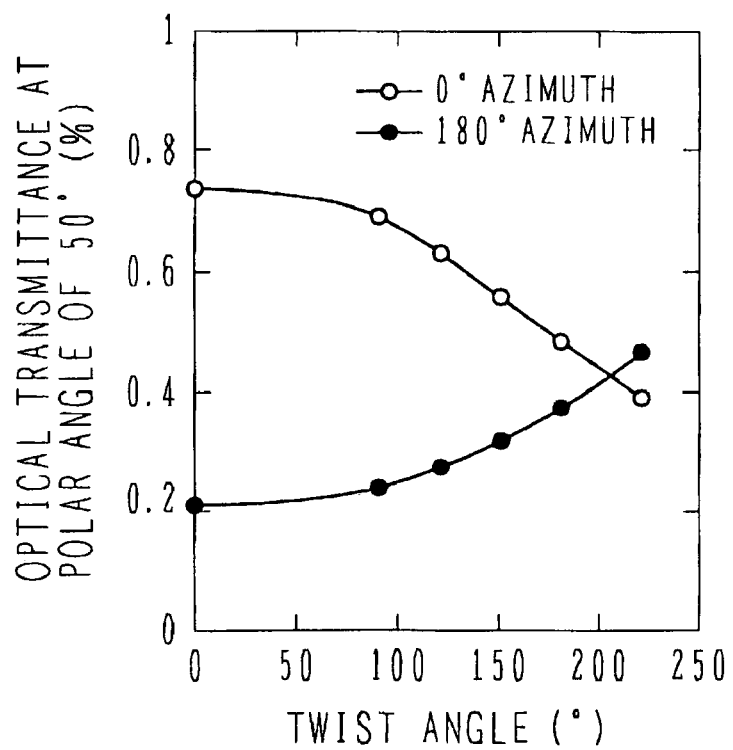
FIG. 12 is a graph showing the relation between a twist angle and an optical transmittance at a polar angle of 50°.

Calculation results are shown in FIG. 12. There is a tendency approximately equal to that at Δnd of about 0.36 μm shown in FIG. 4. At a twist angle in the range from 0° to 90°, an optical transmittance at a polar angle 50° hardly changes, and at a larger twist angle, the optical transmittance changes greatly. At a twist angle of about 210°, an optical transmittance difference is 0 between the 0° and 180° azimuths.

At a twist angle of about 160° or larger, an optical transmittance difference between the right and left sides is a half or smaller than that at a twist angle of 0°. At a twist angle in the range from about 180° or larger and 240° or smaller, an optical transmittance difference between the right and left sides is one thirds or smaller than that at a twist angle of 0°. It is therefore preferable to set the twist angle to 160° or larger, and more preferably 180° or lager and 240° or smaller, irrespective of Δnd.

The present inventor manufactured prototypes of LCD in the preferable twist angle range obtained by the simulations, and confirmed display states. The prototypes were manufactured at twist angles of 180° and 240° which are lower and upper limit values in the preferable range.

For the prototypes, organic alignment film material inducing vertical alignment was used and an alignment process was conducted to provide a uniform pretilt angle of about 88.5° by rubbing. The prototypes were manufactured at d/p=0.25.

The prototype at the twist angle of 180° showed a good display quality, and it was confirmed that the right and left display symmetry was improved as compared to LCD without the twist structure (at a twist angle of 0°).

For the prototype at the twist angle of 240°, an intended twist angle was unable to be set, and the right and left display symmetry was unable to be improved. The electro-optical characteristics of this prototype were analyzed, and it was found that the twist direction is a reverse 60° twist.

The present inventor observed the display states of the 240° twist prototype by changing d/p initially set to 0.25. A good display quality was obtained in the d/p range from 0.4 or larger and 0.74 or smaller. It has been found that as the d/p is made smaller, alignment defects such as rubbing stripes can be observed easily.

The present inventor observed the display states of the prototype at the twist angle of 180° by changing d/p, and stripe alignment defects were recognized at d/p of 0.15 or smaller.

In the twist angle range from 180° or larger and 240° or smaller, it can be considered that d/p is preferably 0.2 or larger and 0.74 or smaller.

The present inventor then simulated light transmittances of a simulation target LCD having the same structure as that of the prototype, at the twist angle of 180° and d/p of 0.25, in the no voltage application state and in the voltage near threshold voltage application state, by using a pretilt angle as a parameter. The observation azimuths were the 0° and 180° azimuths and the observation polar angle was 50°.

Figure 5:
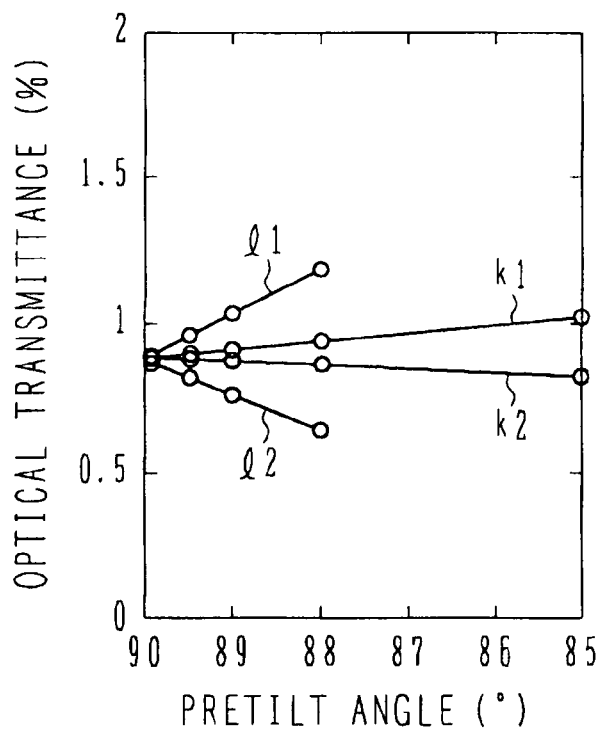
FIG. 5 is a graph showing simulation results.

FIG. 5 is a graph showing the simulation results.

The abscissa of the graph represents a pretilt angle in the unit of "° (degree)" and the ordinate represents an optical transmittance in the unit of "%".

A curve k1 indicates the relation between a pretilt angle and an optical transmittance when observing along the 0° azimuth in the no voltage application state. A curve k2 indicates the relation when observing along the 180° azimuth in the no voltage application state. Curves l1 and l2 indicate the relation when observing along the 0° and 180° azimuths in the voltage near threshold voltage application state, respectively.

The graph shown in FIG. 5 is compared to the graph shown in FIG. 1.

An increase rate indicated by the curve k1 (an increase amount of an optical transmittance relative to a unit increase amount of the pretilt angle) is about one thirds or smaller than the increase rate of the curve c1 shown in FIG. 1, for all simulated pretilt angles.

A decrease rate indicated by the curve k2 (a decrease amount of an optical transmittance relative to a unit increase amount of the pretilt angle) is about one thirds or smaller than the decrease rate of the curve c2 shown in FIG. 1, for all simulated pretilt angles.

An increase rate indicated by the curve l1 is one thirds or smaller than the increase rate indicated by the curve d1 shown in FIG. 1, for all simulated pretilt angles.

A decrease rate indicated by the curve l2 is one thirds or smaller than the decrease rate indicated by the curve d2 shown in FIG. 1, for all simulated pretilt angles.

Therefore, under the conditions of the twist angle of 180° and d/p=0.25, a right and left optical transmittance difference is about one thirds or smaller than that without the twist structure (twist angle of 0°), for all simulated pretilt angles.

In order to confirm the pretilt angle dependency of a display quality of actual LCDs, the present inventor manufactured three prototype LCDs at the pretilt angles of about 89.8°, 89° and 88.5° under the conditions of the twist angle of 180° and d/p=0.25, and the display qualities of LCDs were compared. The same alignment film material was used for the three prototype LCDs. In giving a pretilt angle, different pretilt angles were set to LCDs by using clearances between the substrate and rubbing cloth during the rubbing process.

It could not be said that only the LCD having the pretilt angle of about 89.8° had a good display quality. This prototype took time to stabilize alignment of liquid crystal molecules during voltage application. The reason of being unable to decide a good display quality may be ascribed to that high speed response of the liquid crystal layer is not realized.

It can be considered from the observation results of the prototypes that the pretilt angle is preferably set to 89.5° or smaller.

It is preferable to set the pretilt angle to 88° or larger and more preferably 88.5° or larger. This is because a good contrast is realized in front side observation and a good display quality is obtained for simple matrix drive.

The present inventor has confirmed that not only LCD using the C plate as the viewing angle compensation plate having the upper and lower polarizer disposed strictly in a cross nicol layout (perpendicular nicol), but also LCD having the upper and lower polarizers disposed shifted from the cross nicol layout, e.g., shifted by −5° to +5° (i.e., an angle between the transmission axis of the upper polarizer and the transmission axis of the lower polarizer is 85° to 95° as viewed along the normal direction of the substrate), can have similar advantages.

It has also been confirmed that similar advantages obtained by using the C plate can be realized for the right and left azimuths (180°-0° azimuth) if the C plate is replaced by two A plates. In this case, two A plates have an in-plane retardation Re having a twofold value of the thickness direction retardation $R_{th}$ of the C plate, and are bonded together in such a manner that the delay phase axes are perpendicular and a direction of the delay phase axis of each A plate is a direction in parallel to or perpendicular to the alignment direction of liquid crystal molecules positioned at the center of the liquid crystal layer in a thickness direction. It was recognized that similar advantages can be obtained by disposing the upper and lower polarizers being shifted from the cross nicol state by −5° to +5°.

The present inventor had conducted simulations by using LCD shown in FIG. 3 and having the structure using a biaxial film (optical film having negative biaxial optical anisotropy) as the viewing angle compensation plate, to check the relation between an in-plane direction retardation Re of the biaxial film and an optical transmittance in the no voltage application state.

Figure 2:
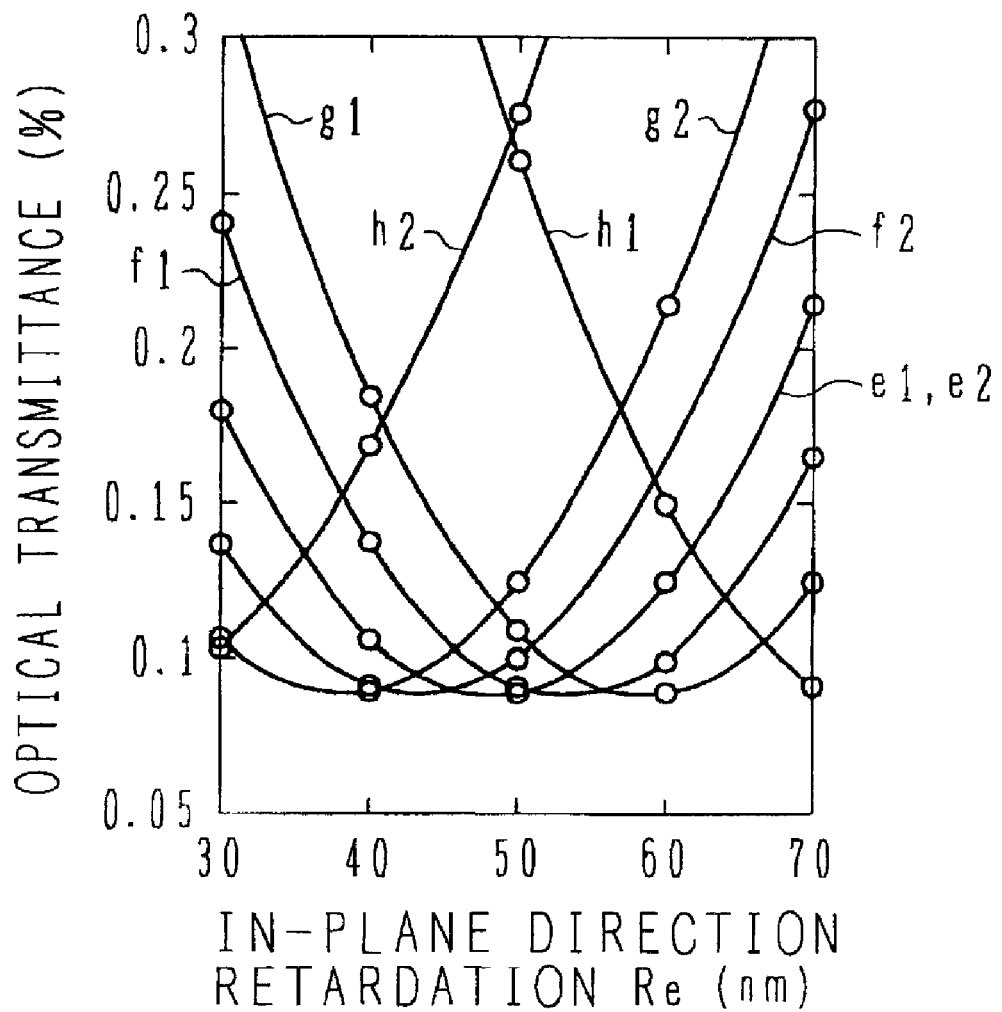
FIG. 2 is a graph showing simulation results.

This simulation target has an alignment azimuth of 270° of liquid crystal molecules positioned at the center of the liquid crystal layer in the thickness direction. The rubbing azimuth of the upper and lower substrate surfaces was set to the 0° azimuth, and a left twist liquid crystal layer was assumed to have a twist angle of 180°. d/p was set to 0.25. The retardation $\Delta$nd of the liquid crystal layer, the thickness direction retardation $R_{th}$ of the biaxial film, the azimuth of the in-plane delay phase axis of the biaxial film, the transmission axis azimuth of the upper and lower polarizers and the like were set to the same values as those of LCD used for the results shown in FIG. 2.

The observation azimuths were the 0° and 180° azimuths and the observation polar angle was 50°.

Figure 6:
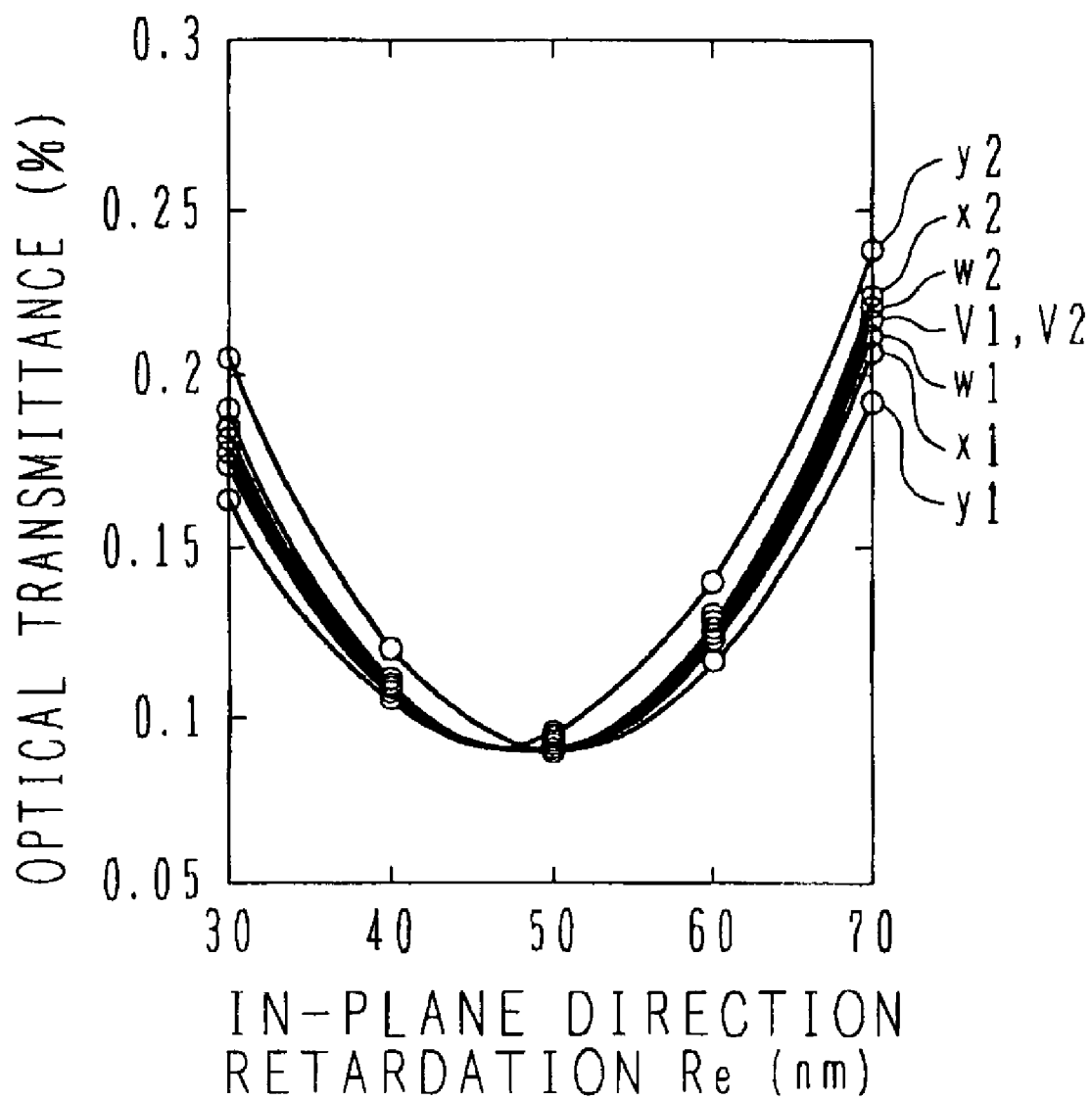
FIG. 6 is a graph showing simulation results.

FIG. 6 is a graph showing the simulation results.

The abscissa of the graph represents an in-plane direction retardation Re of the biaxial film in the unit of "nm" and the ordinate represents an optical transmittance in the unit of "%".

A curve v1 indicates the relation between an in-plane direction retardation Re and an optical transmittance when observing along the 0° azimuth at a pretilt angle of 90°. A curve v2 indicates the relation when observing along a 180° azimuth at a pretilt angle of 90°. The curves v1 and v2 are the same and drawn superposed one upon the other.

Curves w1 and w2 indicate the relation when observing along the 0° and 180° azimuths at a pretilt angle of 89°, respectively.

Curves x1 and x2 indicate the relation when observing along the 0° and 180° azimuths at a pretilt angle of 88°, respectively.

Curves y1 and y2 indicate the relation when observing along the 0° and 180° azimuths at a pretilt angle of 85°, respectively.

All of the eight curves v1 to y2 are close each other. This means that the relation between the in-plane direction retardation Re of the biaxial film and the optical transmittance has less viewing angle azimuth (0°-180° azimuth) dependency and pretilt angle dependency. It can be seen that for all simulated pretilt angles, the optical transmittance is minimum at Re of about 50 nm and good black display quality is realized.

The present inventor has confirmed that similar results are also obtained if optical characteristics of a biaxial film are realized by a combination of an A plate (Re of about 80 nm) and a C plate.

Other combinations may be (i) both the A plate and C plate are disposed between the upper substrate and upper polarize and/or between the lower substrate and lower polarizer, (ii) one of the A plate and C plate is disposed between the upper substrate and upper polarizer and the other is disposed between the lower substrate and lower polarizer, (iii) both the biaxial film and C plate are disposed between the upper plate and upper polarizer and/or between the lower substrate and lower polarizer, and (iv) one of the biaxial film and C plate is disposed between the upper plate and upper polarizer and the other is disposed between the lower substrate and lower polarizer.

The present invention has been described in connection with the preferred embodiments. The invention is not limited only to the above-described embodiments.

For example, although the C plate is disposed between the lower substrate and lower polarizer in the embodiments, the C plate may be disposed between the upper substrate and upper polarizer.

It will be apparent to those skilled in the art that other various modifications, improvements, combinations, and the like can be made.

The present invention is applicable to the vertical alignment type LCD irrespective of whether LCD is a simple matrix or an active matrix.

Since the right and left display qualities can be matched, the present invention is applicable to a vehicle mount display and a portable information terminal display.

What is claimed is:

1. A liquid crystal display comprising:
   a first substrate provided with an electrode pattern and subjected to an alignment process giving a pretilt angle that is at least 88.5° and not greater than 89.5°;
   a second substrate disposed generally in parallel to said first substrate, provided with an electrode pattern and subjected to an alignment process giving a pretilt angle that is at least 88.5° and not greater than 89.5°;
   a liquid crystal layer sandwiched between said first substrate and said second substrate, wherein the liquid crystal layer:
      has a thickness d;
      is made of liquid crystal molecule material which (i) is aligned generally perpendicular to said first substrate and said second substrate in a no voltage application state, and (ii) has a twist structure at a twist angle that is at least 160° and not greater than 240° in a voltage application state, in accordance with the alignment processes to which the first and second substrates are subjected; and
      contains chiral material having a chiral pitch p, where d/p is at least 0.2 and not greater than 0.74;
   a first polarizer disposed facing a plane of said first substrate on a side opposite to said liquid crystal layer, said first polarizer having as a transmission axis direction a first direction;
   a second polarizer disposed facing a plane of said second substrate on a side opposite to said liquid crystal layer, said second polarizer having as a transmission axis direction a second direction at an angle of at least 85° and not greater than 95° relative to said first direction as viewed along a direction normal to said first substrate and said second substrate; and
   an optical anisotropic plate having a delay phase axis in parallel to an in-plane direction of said first and second polarizers and disposed at least one of between said first substrate and said first polarizer and between said second substrate and said second polarizer.

2. The liquid crystal display according to claim 1, wherein a retardation $\Delta$nd, which is a product of a birefringence $\Delta$n of said liquid crystal molecule material and the thickness d of said liquid crystal layer, is 580 nm or larger.

3. The liquid crystal display according to claim 1, wherein said optical anisotropic plate has negative uniaxial optical anisotropy, and is disposed at least one of between said first substrate and said first polarizer and between said second substrate and said second polarizer.

4. The liquid crystal display according to claim 1, wherein said optical anisotropic plate comprises two positive uniaxial optical anisotropic plates disposed in a state that delay phase axes are mutually perpendicular, and is disposed at least one of between said first substrate and said first polarizer and between said second substrate and said second polarizer.

5. The liquid crystal display according to claim 1, wherein said optical anisotropic plate has negative biaxial optical anisotropy, and is disposed at least one of between said first substrate and said first polarizer and between said second substrate and said second polarizer.

6. The liquid crystal display according to claim 1, wherein said optical anisotropic plate comprises an optical anisotropic plate having positive uniaxial anisotropy and an optical anisotropic plate having negative uniaxial anisotropy, and is disposed at least one of between said first substrate and said first polarizer and between said second substrate and said second polarizer.

7. The liquid crystal display according to claim 1, wherein said optical anisotropic plate comprises an optical anisotropic plate having negative biaxial anisotropy and an optical anisotropic plate having negative uniaxial anisotropy, and is disposed at least one of between said first substrate and said first polarizer and between said second substrate and said second polarizer.

* * * * *